(12) United States Patent
Breeden, III et al.

(10) Patent No.: US 10,400,999 B2
(45) Date of Patent: Sep. 3, 2019

(54) LIGHTED LOADING RAMP

(71) Applicant: WINSTON PRODUCTS, LLC, Cleveland, OH (US)

(72) Inventors: Winston H. Breeden, III, Chagrin Falls, OH (US); Colleen Kurniawan, Cleveland, OH (US); Douglas E. Whitner, Chagrin Falls, OH (US); David Drabousky, Twinsburg, OH (US)

(73) Assignee: WINSTON PRODUCTS LLC, Cleveland, OH (US)

( * ) Notice: Subject to any disclaimer, the term of this patent is extended or adjusted under 35 U.S.C. 154(b) by 200 days.

(21) Appl. No.: 15/269,234

(22) Filed: Sep. 19, 2016

(65) Prior Publication Data

US 2017/0081137 A1    Mar. 23, 2017

Related U.S. Application Data

(60) Provisional application No. 62/272,368, filed on Dec. 29, 2015, provisional application No. 62/220,901, filed on Sep. 18, 2015.

(51) Int. Cl.
| | | |
|---|---|---|
| *E01D 1/00* | (2006.01) |
| *F21V 15/01* | (2006.01) |
| *B65G 69/30* | (2006.01) |
| *F21S 9/02* | (2006.01) |
| *B60Q 1/30* | (2006.01) |
| *F21V 33/00* | (2006.01) |
| *F21V 23/04* | (2006.01) |
| *F21Y 115/10* | (2016.01) |

(52) U.S. Cl.
CPC .............. *F21V 15/01* (2013.01); *B60Q 1/307* (2013.01); *B65G 69/30* (2013.01); *F21S 9/02* (2013.01); *F21V 33/00* (2013.01); *F21V 23/04* (2013.01); *F21Y 2115/10* (2016.08)

(58) Field of Classification Search
USPC .................. 14/69.5; 362/577; 116/63 R, 63 P
See application file for complete search history.

(56) References Cited

U.S. PATENT DOCUMENTS

| | | | | |
|---|---|---|---|---|
| 3,906,476 A | * | 9/1975 | Yonezu ................... | H01H 51/28 335/153 |
| 4,311,208 A | * | 1/1982 | Macrorie ................ | E06C 7/003 182/129 |
| 4,364,104 A | * | 12/1982 | Holahan ................... | F21L 2/00 362/109 |
| 4,491,991 A | * | 1/1985 | Herbruck ............... | A47K 13/24 116/67 R |
| 4,755,915 A | * | 7/1988 | Rogers ............... | A47G 29/1209 362/155 |

(Continued)

*Primary Examiner* — Thomas B Will
*Assistant Examiner* — Katherine J Chu
(74) *Attorney, Agent, or Firm* — Tucker Ellis LLP

(57) ABSTRACT

A loading ramp includes first and second ramp portions that are coupled by a hinge assembly such that the first and second ramp portions are movable relative to one another between an extended position and a folded position. The loading ramp also has one or more lights coupled to one of the ramp portions and a switch assembly coupled to the ramp portions such that in the extend position the switch assembly is activated to illuminate the one or more lights.

16 Claims, 17 Drawing Sheets

(56) References Cited

U.S. PATENT DOCUMENTS

| | | | | |
|---|---|---|---|---|
| 4,766,525 A * | 8/1988 | Loughlin | ................. | A61B 5/00 |
| | | | | 182/18 |
| D348,552 S * | 7/1994 | Woodward | ................. | D34/32 |
| 5,347,434 A * | 9/1994 | Drake | ................. | B64D 11/00 |
| | | | | 244/118.5 |
| 5,558,429 A * | 9/1996 | Cain | ................. | A45C 15/06 |
| | | | | 200/61.83 |
| 5,586,355 A * | 12/1996 | Metz | ................. | B65G 69/2882 |
| | | | | 14/69.5 |
| 5,848,837 A * | 12/1998 | Gustafson | ................. | B64F 1/002 |
| | | | | 362/235 |
| 5,907,276 A * | 5/1999 | Lance | ................. | B60P 1/435 |
| | | | | 14/71.1 |
| 6,139,249 A | 10/2000 | Lucht | | |
| 6,213,622 B1 * | 4/2001 | Shimada | ................. | F21V 33/006 |
| | | | | 362/146 |
| 6,447,142 B1 * | 9/2002 | Weir | ................. | A45C 15/06 |
| | | | | 150/100 |
| 6,643,878 B2 | 11/2003 | Schmaltz et al. | | |
| 7,299,517 B1 | 11/2007 | Adinolfe | | |
| 7,533,431 B2 * | 5/2009 | Hochstein | ................. | B60Q 1/307 |
| | | | | 14/69.5 |
| 7,810,197 B1 * | 10/2010 | Anthony | ................. | F16L 3/2235 |
| | | | | 14/69.5 |
| 7,895,693 B2 * | 3/2011 | Woodmansee, III | ................. | |
| | | | | E01D 15/124 |
| | | | | 14/69.5 |
| 8,141,296 B2 * | 3/2012 | Bem | ................. | E05B 47/02 |
| | | | | 340/686.6 |
| 8,256,053 B2 | 9/2012 | Astor et al. | | |
| 8,276,965 B2 * | 10/2012 | Turnbow | ................. | B62D 33/02 |
| | | | | 296/26.1 |
| 8,334,501 B1 * | 12/2012 | Cox | ................. | G02B 6/3514 |
| | | | | 250/221 |
| 8,448,278 B1 | 5/2013 | Beilstein | | |
| 8,495,779 B2 | 7/2013 | Metcalfe et al. | | |
| 8,547,234 B2 * | 10/2013 | Maly | ................. | B65G 69/2882 |
| | | | | 14/6 |
| 8,561,238 B1 | 10/2013 | Inget | | |
| 8,590,087 B2 * | 11/2013 | Swessel | ................. | B65G 69/2882 |
| | | | | 14/69.5 |
| 8,821,102 B1 | 9/2014 | Boguslawski | | |
| 8,844,083 B2 * | 9/2014 | McGivern | ................. | E04F 11/002 |
| | | | | 14/69.5 |
| 8,944,743 B2 | 2/2015 | Astor et al. | | |
| 9,221,631 B2 | 12/2015 | Breeden, III et al. | | |
| 9,526,142 B2 * | 12/2016 | Schroder | ................. | H05B 37/0218 |
| 2004/0083562 A1 | 5/2004 | Leblanc | | |
| 2004/0160296 A1 * | 8/2004 | Gilmore | ................. | H01H 36/0006 |
| | | | | 335/207 |
| 2005/0168999 A1 * | 8/2005 | Sommers | ................. | F21V 21/26 |
| | | | | 362/427 |
| 2005/0254237 A1 * | 11/2005 | Nath | ................. | F21L 4/00 |
| | | | | 362/190 |
| 2006/0200919 A1 | 9/2006 | Frahm | | |
| 2009/0016865 A1 | 1/2009 | Astor et al. | | |
| 2009/0187078 A1 * | 7/2009 | Dunlop | ................. | A61B 1/0684 |
| | | | | 600/179 |
| 2011/0197378 A1 * | 8/2011 | De La Chevrotiere | ... | E01D 6/00 |
| | | | | 14/69.5 |
| 2014/0096712 A1 * | 4/2014 | Houle | ................. | E01F 9/688 |
| | | | | 116/63 P |
| 2014/0230167 A1 | 8/2014 | Romanak et al. | | |
| 2017/0057425 A1 * | 3/2017 | Pulleyblank | ................. | B60R 13/01 |

* cited by examiner

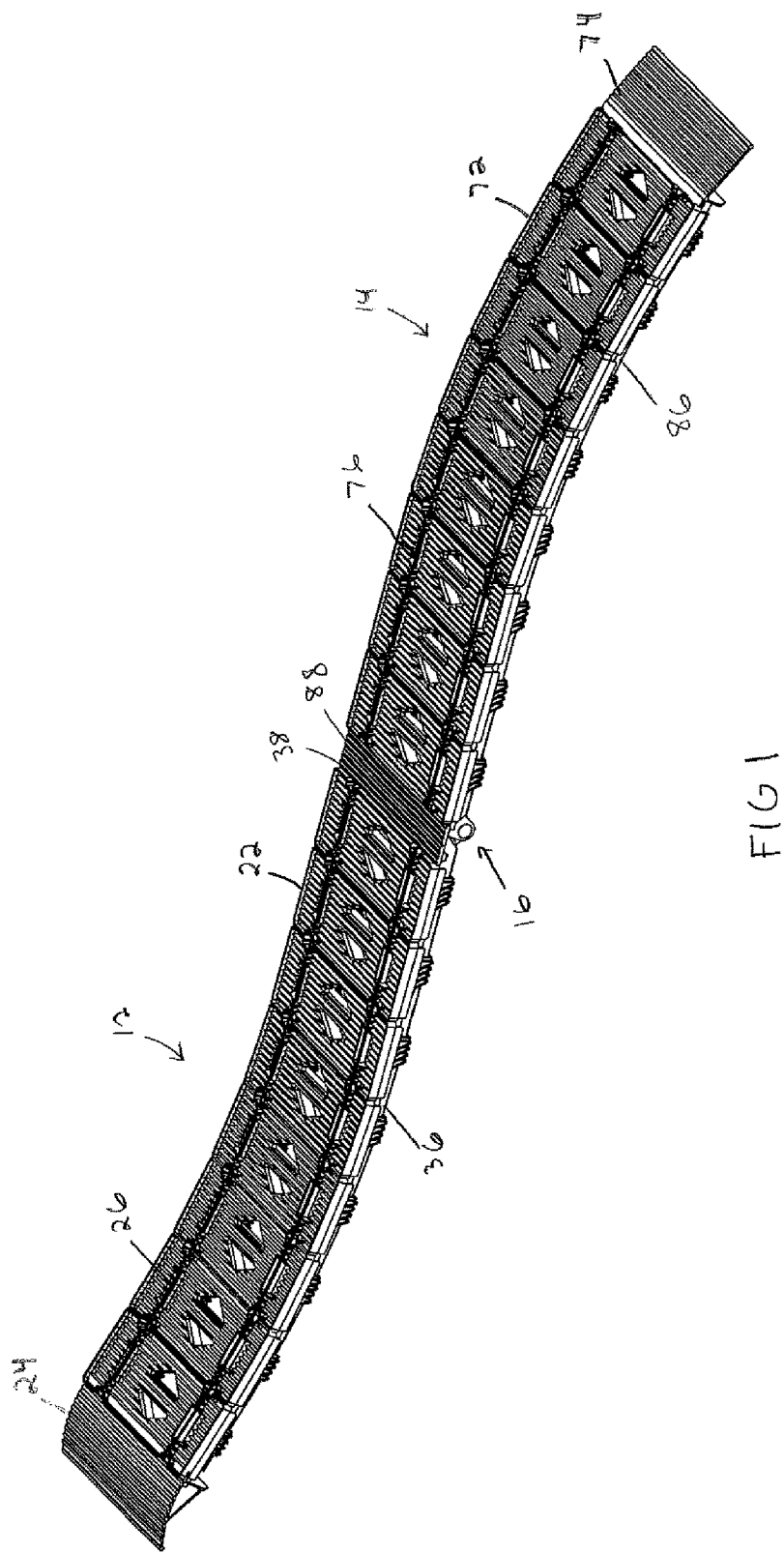

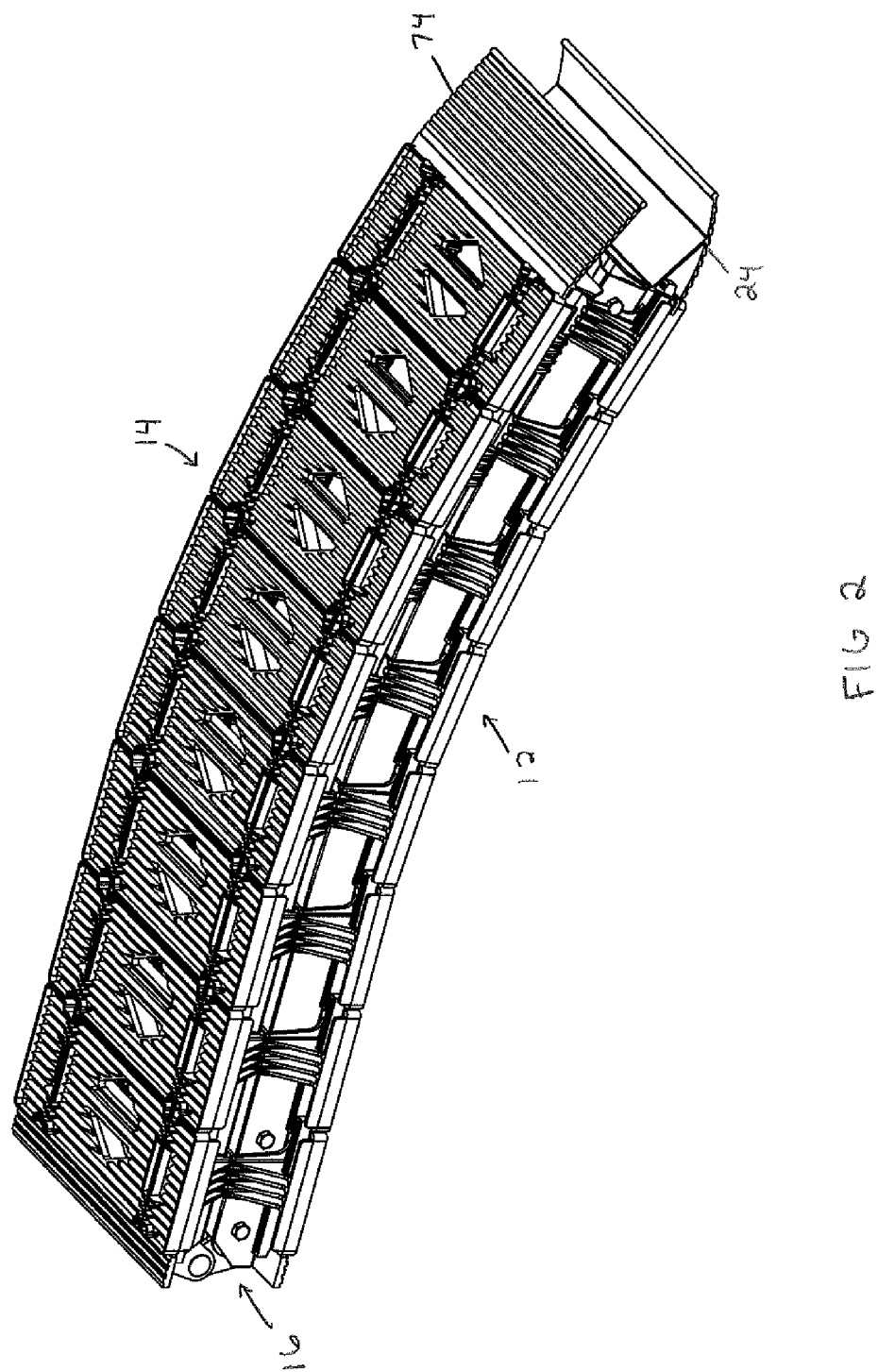

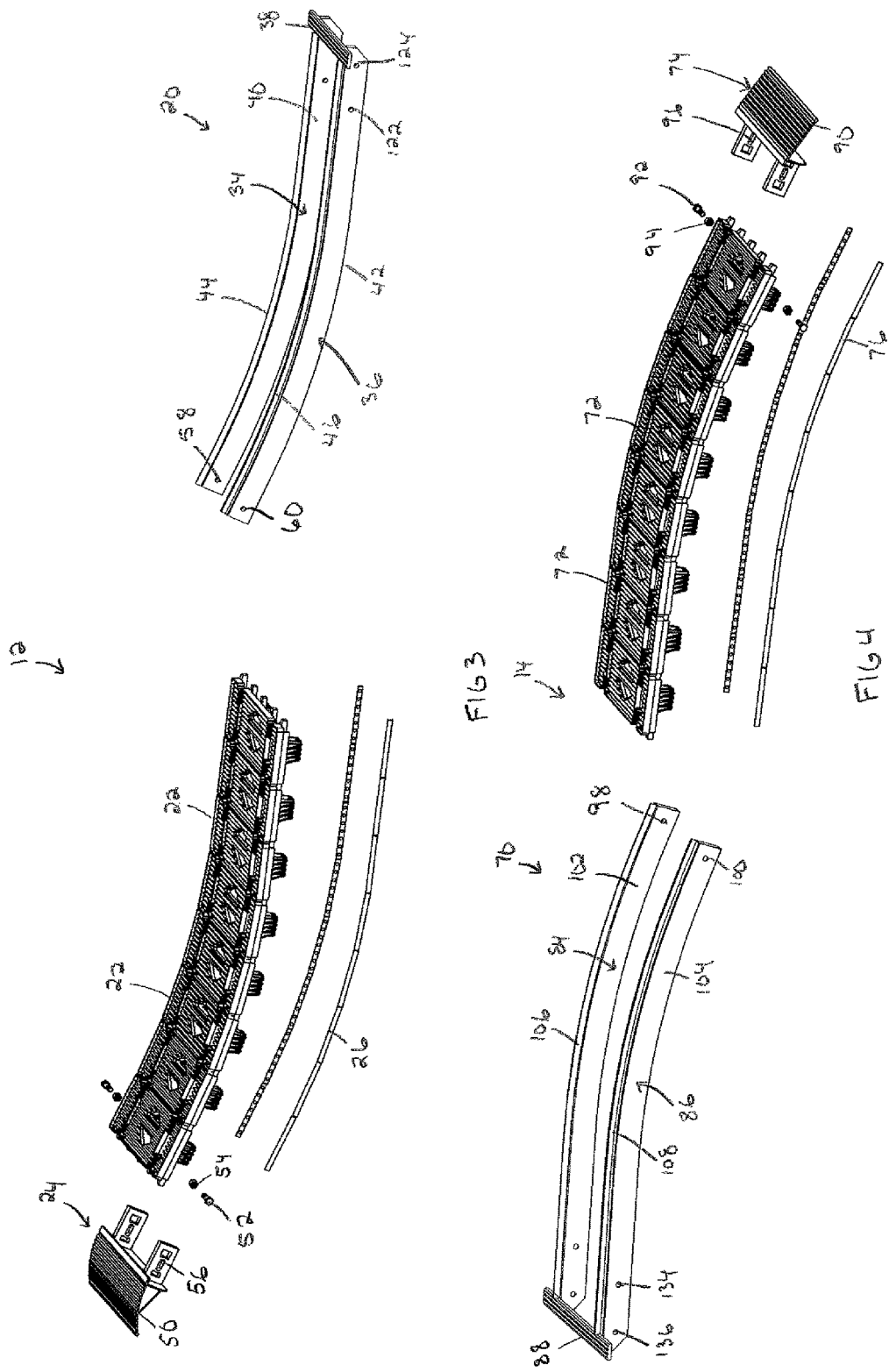

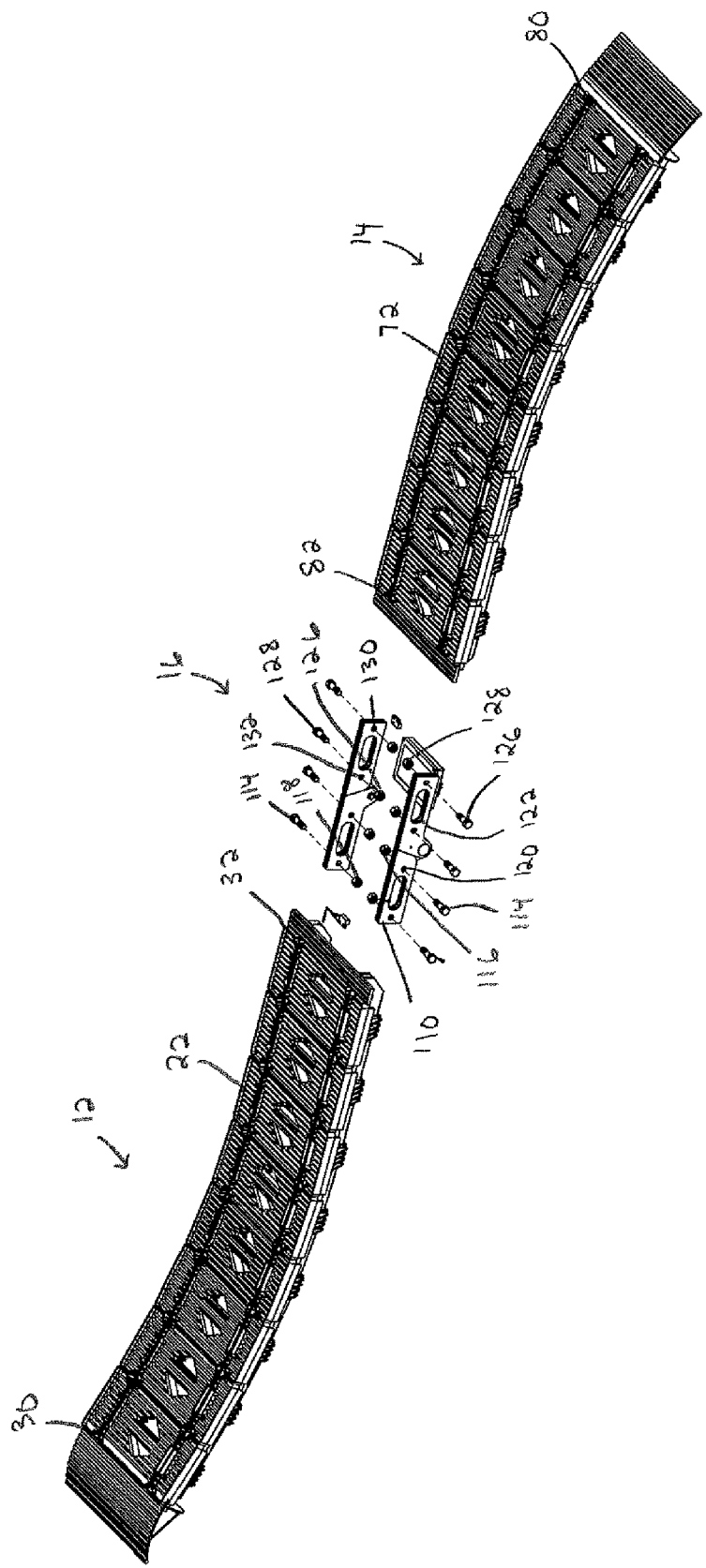

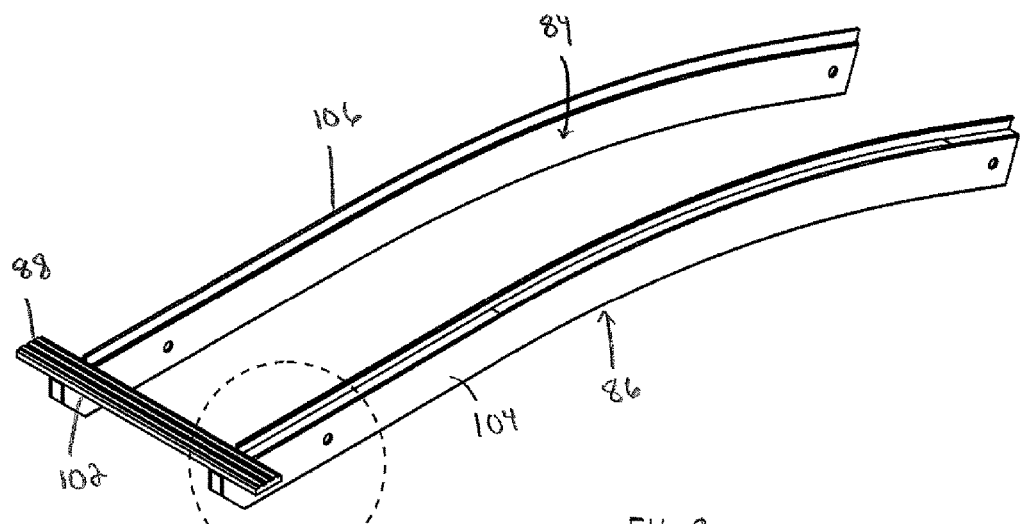
FIG 8
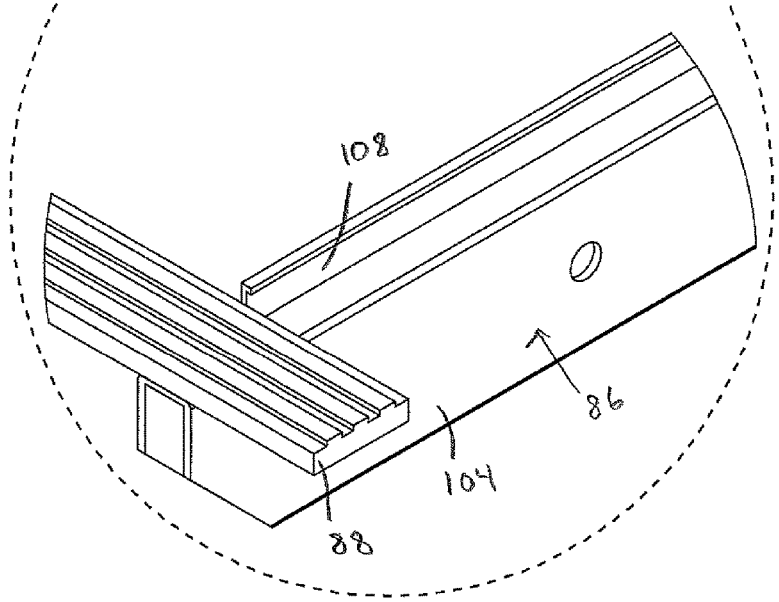

LIGHTED LOADING RAMP

RELATED APPLICATIONS

This application claims the benefit of U.S. Provisional Application No. 62/220,901 filed Sep. 18, 2015 and U.S. Provisional Application No. 62/272,368 filed Dec. 29, 2015, which are hereby incorporated herein by reference.

FIELD OF INVENTION

The present invention relates generally to loading ramps, and more particularly to lighted vehicle loading ramps.

BACKGROUND

A loading ramp can be used to support one or more objects. For example, a loading ramp can support a vehicle, snowmobile, motorcycle, etc. The loading ramp can be positioned to extend between a first surface and a second surface. As such, the vehicle can be moved from the first surface to the second surface by moving across/over the loading ramp. Loading ramps can be relatively long in length and may be cumbersome when stored/stowed. Furthermore, loading ramps are sometimes needed to support a relatively heavy weight, such as the heavy weights associated with vehicles.

SUMMARY OF INVENTION

The present application provides a loading ramp having first and second ramp portions coupled by a hinge assembly such that the first and second ramp portions are movable relative to one another between an extended position and a folded position. The loading ramp also has one or more lights coupled to one of the ramp portions and a switch assembly coupled to the ramp portions such that in the extend position the switch assembly is activated to illuminate the one or more lights.

In an embodiment, a loading ramp is provided that includes a first ramp portion, a second ramp portion, a hinge assembly coupling the first and second ramp portions such that the first and second ramp portions are movable relative to one another between an extended position and a folded position, a switch assembly having a first portion coupled to the first ramp portion and a second portion coupled to the second ramp portion, the first and second portions configured to engage or be in close proximity to one another in the extended position and disengage in the folded position, at least one first light coupled to the first ramp portion and operatively coupled to the switch assembly, and at least one second light coupled to the second ramp portion and operatively coupled to the switch assembly, wherein in the extended position the switch assembly is activated to illuminate first and second lights.

The ramp may include a power source coupled to one of the first or second ramp portions, wherein the power source is operatively coupled to switch assembly and the first and second lights to power the lights.

The power source may be a battery hub coupled to a bottom surface of one of the first or second ramp portions.

The first and second lights may be operatively coupled to the first portion of the switch assembly by a respective wire, the first and second lights are operatively coupled to the switch assembly by a respective wire, and the power source is operatively coupled to the switch assembly by a wire.

The first and second portions of the switch assembly may each have a face substantially perpendicular to top surfaces of the first and second ramp portions, and wherein the faces are configured to engage or be in close proximity to one another in the extended position.

The first portion of the switch assembly may be a reed switch and the second portion is a magnet.

The first portion of the switch assembly may be a pressure switch and the second portion is a pedal.

The first ramp portion may include a first rail portion and a first tread portion having a tread opening through which the first rail portion extends and a channel through which the at least one first light extends, and wherein the second ramp portion includes a second rail portion and a second tread portion having a tread opening through which the second rail portion extends and a channel through which the at least one second light extends.

Each channel may open towards the respective tread opening, and wherein the first and second rail portions trap the first and second lights in the respective channels.

The loading ramp may include an L-shaped portion coupled to or integrally formed with the first rail portion and extending through the channel with the first light, and an L-shaped portion coupled to or integrally formed with the second rail portion and extending through the channel with the second light.

Each channel may include a pair of channels on opposite ends of the respective tread opening, and wherein a gap is formed between each pair of channels above the respective tread opening through which the lights are visible.

According to another embodiment, a loading ramp is provided that includes a first ramp portion, a second ramp portion, a hinge assembly coupling the first and second ramp portions such that the first and second ramp portions are movable relative to one another between an extended position and a folded position, at least one first light coupled to the first ramp portion, and at least one second light coupled to the second ramp portion, wherein in the extended position the at least one first and second lights are activated, and in the folded position the at least one first and second lights are deactivated.

The loading ramp may further include a switch assembly having a first portion coupled to the first ramp portion and a second portion coupled to the second ramp portion, the first and second portions configured to engage or be in close proximity to one another in the extended position and disengage in the folded position, wherein the at least one first and second lights are operatively coupled to the switch assembly.

The loading ramp may further include a power source coupled to one of the first or second ramp portions, wherein the power source is operatively coupled to the first and second lights to power the lights.

The power source may be a battery hub coupled to a bottom surface of one of the first or second ramp portions.

The first and second lights may be operatively coupled to the first portion of the switch assembly by a respective wire, the first and second lights are operatively coupled to the power source by a respective wire, and the power source is operatively coupled to the switch assembly by a wire.

The first and second ramp portions may each include one or more channels opening to a top surface of each portion for receiving the at least one first or second light respectively.

The first portion of the switch assembly may be a reed switch and the second portion is a magnet.

The first portion of the switch assembly may be a pressure switch and the second portion is a pedal.

According to still another embodiment, a loading ramp is provided that includes a first ramp portion including a first rail portion having a rectangular section and an L-shaped section, and a first tread portion having a first tread opening through which the rectangular section extends and a first channel that opens towards the first tread opening though which the L-shaped section extends, a second ramp portion including a second rail portion having a rectangular section and an L-shaped section, and a second tread portion having a second tread opening through which the rectangular section extends and a second channel that opens towards the second tread opening though which the L-shaped section extends, a hinge assembly coupling the first and second ramp portions such that the first and second ramp portions are movable relative to one another between an extended position and a folded position, a switch assembly having a first portion coupled to the first ramp portion and a second portion coupled to the second ramp portion, the first and second portions of the switch assembly configured to engage or be in close proximity to one another in the extended position and disengage in the folded position, at least one first light coupled to the first ramp portion and operatively coupled to the switch assembly, and at least one second light coupled to the second ramp portion and operatively coupled to the switch assembly, wherein in the extended position the switch assembly is activated to illuminate first and second lights.

The foregoing and other features of the application are described below with reference to the drawings.

BRIEF DESCRIPTION OF THE DRAWINGS

FIG. 1 is a perspective view of any exemplary loading ramp in an extended position.

FIG. 2 is a perspective view of the loading ramp in a folded position.

FIG. 3 is an exploded view of a first ramp portion of the loading ramp.

FIG. 4 is an exploded view of a second ramp portion of the loading ramp.

FIG. 5 is a view of the first and second ramp portions uncoupled from a hinge assembly.

FIG. 8 is a perspective view of rails of the loading ramp.

DETAILED DESCRIPTION

Figure 6:
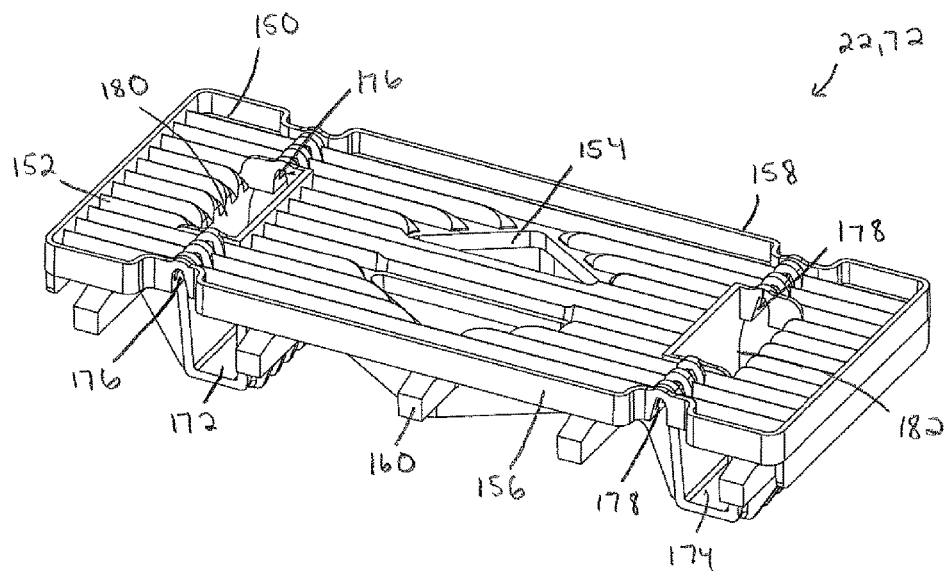
FIG. 6 is a perspective view of an exemplary tread portion of the loading ramp.

Turning to FIGS. 1 and 2, an exemplary loading ramp is shown generally at reference numeral 10. The loading ramp 10 can be supported between a first surface, such as a floor, ground, etc., and a second surface, which may be elevated above the first surface, such as a tailgate of a vehicle, a deck of a trailer, etc. Alternatively, the first and second surfaces can be substantially planar with respect to each other.

The loading ramp 10 includes a first ramp portion 12 and a second ramp portion 14 coupled together by a hinge assembly 16. The first ramp portion 12 can be supported on the first surface and the second ramp portion 14 can be supported on the second surface to support a weight, such as the weight of a vehicle, such as an all-terrain vehicle, snowmobile, etc. The loading ramp can be used with another loading ramp, for example in a side-by-side configuration to such that each ramp supports the wheels on one side of the vehicle.

Figure 9:
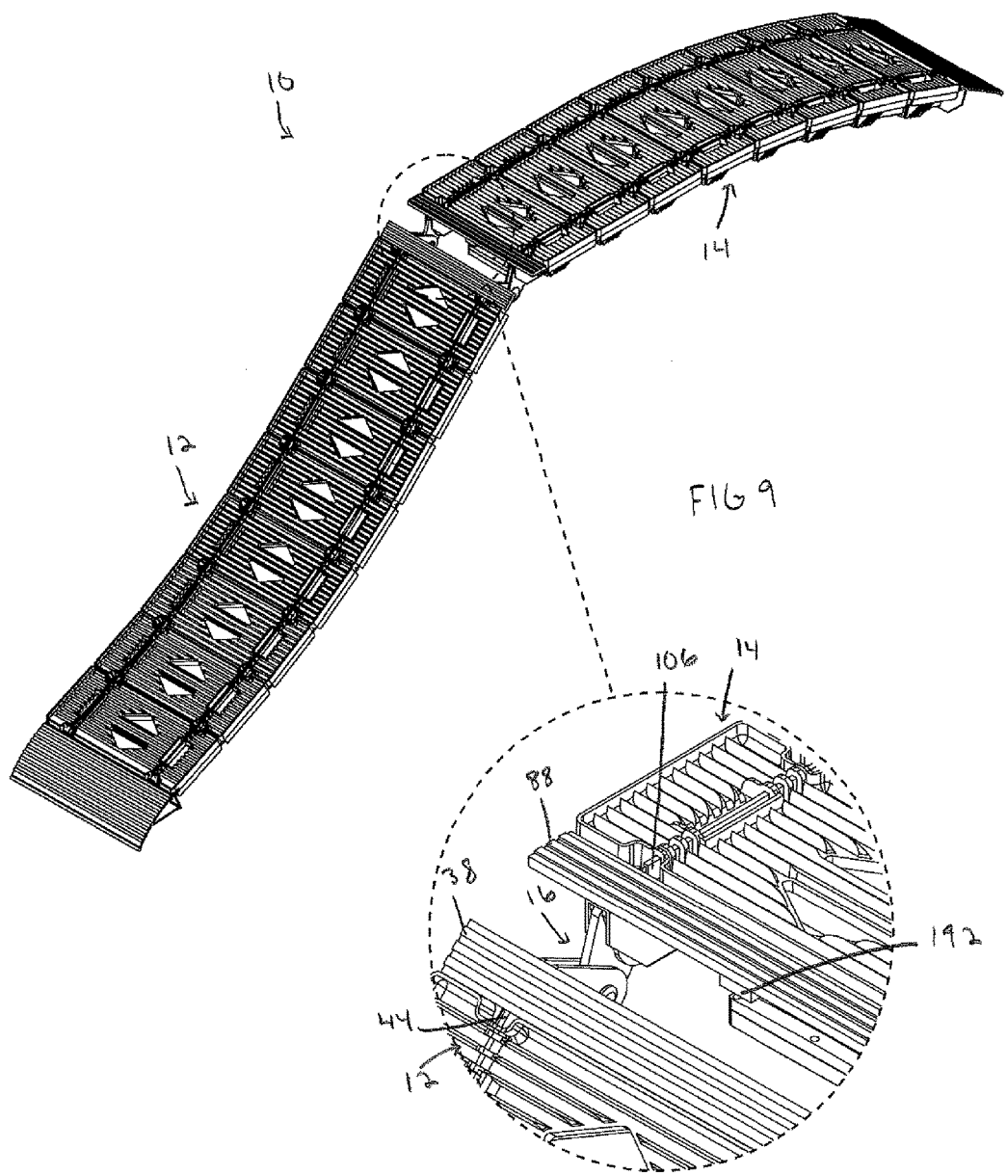
FIG. 9 is a perspective view of the loading ramp in a partially extended position.

The loading ramp 10 is movable between an extend position shown in FIG. 1, a plurality of partially extended positions, one of which is shown in FIG. 9, and a folded position shown in FIG. 2. In particular, the first and second ramp portions 12 and 14 are movable relative to one another between the extended position and the folded position. In the extended position, the first ramp portion 12 is supported on the first surface and the second ramp portion 14 is supported on the second surface. In the folded position, the first and second ramp portions nest with each other such that a minimal space exists between the first ramp portion 12 and the second ramp portion 14. Due to the non-linear shape of the first and second ramp portions 12 and 14, in the folded position the first ramp portion 12 has a substantially matching shape to the second ramp portion 14.

Turning now to FIG. 3, an exploded view of the first ramp portion 12 is illustrated. The first ramp portion 12 extends along a non-linear axis that can include a curve, bend, undulation, etc., and in the illustrated embodiment a concave shape. The first ramp portion 12 includes a first rail portion 20, a plurality of first tread portions 22, a first end portion 24, and one or more lights 26, and in the illustrated embodiment a pair of LED strip lights that extend along the non-linear axis.

The first rail portion 20 extends between a first end 30 of the ramp portion 12 configured to be supported on the first surface, and a second end 32 opposite the first end. The first rail portion 20 includes a first rail 34 and a second rail 36 spaced apart and extending between the first and second ends 30 and 32 along the non-linear axis generally parallel to each other. The first and second rails 34 and 36 may be made of any suitable material, such as metal, a composite material, a polymer material, a combination thereof, etc. Connecting the first and second rails 34 and 36 is a first support structure 38 at the second end 32, which may be any suitable structure, such as a bar, rail, or other similar structure that has at least some degree of rigidity/inflexibility. The first support structure 38 supports/holds/maintains the first rail 34 and the second rail 36 in their spaced apart arrangement.

Figure 7:
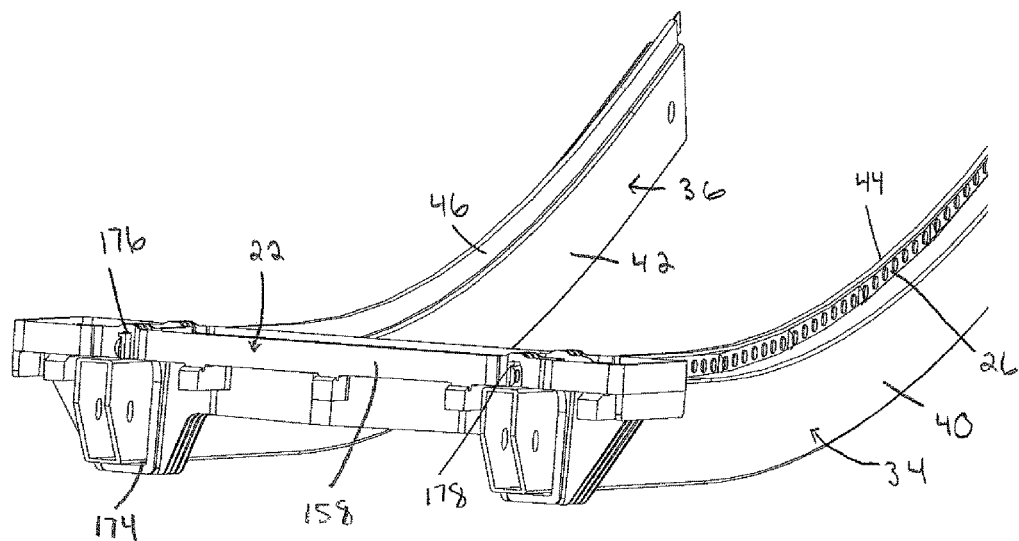
FIG. 7 is a perspective view of the tread portion and rails of the loading ramp.

The first and second rails 34 and 36 each include a substantially rectangular portion 40, 42 and an L-shaped portion 44, 46 coupled to or integrally formed with the portion 40, 42. The L-shaped portions 44 and 46 form with the top of the rectangular portions 40 and 42 channels for supporting the lights 26 as shown in FIG. 7.

The plurality of first tread portions 22 are removably attached to the first rail portion 20 and provided to support the weight of the vehicle being moved along the ramp. The plurality of first tread portions 22 may be any suitable size, shape, and structure, and in the illustrated embodiment are substantially identical in size, shape, and structure. The plurality of first tread portions 22 may also be made of any suitable material, such as structural foam, polymer, metal, etc.

The first end portion 24 is positioned at the first end 30 of the first ramp portion 12 and includes a lip 50 that projects outwardly in a direction away from the first tread portions 22. The lip 50 can engage/contact the first surface when the first end 30 of the first ramp portion 12 is supported on the first surface. The first end portion 24 can be attached to the first and second rails 34 and 36 in any suitable way, such as by bolts 52 and nuts 54 that are received in openings 56 in the first end portion 24 and in openings 58 and 60 in the first and second rail 34 and 36 respectively. The first end portion 24 may also be made of any suitable material, such as structural foam, polymer, metal, etc.

Turning now to FIG. 4, an exploded view of the second ramp portion 14 is illustrated. The second ramp portion 14 extends along a non-linear axis, and in the illustrated embodiment is a convex shape. The first ramp portion 12 and the second ramp portion 14 have substantially opposite shapes, such that the loading ramp 10 has a generally S-shaped curve. The second ramp portion 14 includes a second rail portion 70, a plurality of second tread portions 72, a second end portion 74, and one or more lights 76, and in the illustrated embodiment a pair of LED strip lights.

The second rail portion 70 extends between a first end 80 of the ramp portion 14 configured to be supported on the second surface, and a second end 82 opposite the first end. The second rail portion 70 includes a third rail 84 and a fourth rail 86 spaced apart and extending between the first and second ends 80 and 82 along the non-linear axis generally parallel to each other. The third and fourth rails 84 and 86 may be made of any suitable material, such as metal, a composite material, a polymer material, a combination thereof, etc. Connecting the third and fourth rails 84 and 86 is a second support structure 88 at the second end 82, which may be any suitable structure, such as a bar, rail, or other similar structure that has at least some degree of rigidity/inflexibility. The second support structure 88 supports/holds/maintains the third rail 84 and the fourth rail 86 in their spaced apart arrangement.

The plurality of second tread portions 72 are removably attached to the second rail portion 70 and provided to support the weight of the vehicle being moved along the ramp. The plurality of second tread portions 72 may be any suitable size, shape, and structure, and in the illustrated embodiment are substantially identical in size, shape, and structure. The plurality of second tread portions 72 may also be made of any suitable material, such as structural foam, polymer, metal, etc.

The second end portion 74 is positioned at the first end 80 of the second ramp portion 14 and includes a lip 90 that projects outwardly in a direction away from the second tread portions 72. The lip 90 can engage/contact the second surface when the first end 80 of the second ramp portion 14 is supported on the second surface. The second end portion 74 can be attached to the third and fourth rails 84 and 86 in any suitable way, such as by bolts 92 and nuts 94 that are received in openings 96 in the second end portion 74 and in openings 98 and 100 in the third and fourth rails 84 and 86 respectively. The second end portion 74 may also be made of any suitable material, such as structural foam, polymer, metal, etc.

As shown in FIGS. 4 and 8, the third and fourth rails 84 and 86 each include a substantially rectangular portion 102, 104 and an L-shaped portion 106, 108 coupled to or integrally formed with the portion 102, 104. The L-shaped portions 106 and 108 form with the top of the rectangular portions 102 and 104 channels for supporting the lights 76.

Referring now to FIG. 5 in addition to FIGS. 3 and 4, the first ramp portion 12 and the second ramp portion 14 are shown uncoupled from the hinge assembly 16. The hinge assembly 16 includes a first hinge bracket 110 that is movably attached with respect to a second hinge bracket 112. The first hinge bracket 110 is coupled to the second end 32 of the first ramp portion 12 and the second hinge bracket 112 is coupled to the second end 82 of the second hinge bracket 14. The first hinge bracket 110 is attached to the first and second rails 34 and 36 in any suitable way, such as by bolts 114 and nuts 116 that are received in openings 118 and 120 in the first hinge bracket 110 and in openings 122 and 124 in the first and second rails 34 and 36. Similarly, the second hinge bracket 112 is attached to the third and fourth rails 84 and 86 in any suitable manner, such as by bolts 126 and nuts 128 that are received in openings 130 and 132 in the second hinge bracket 112 and in openings 134 and 136 in the third and fourth rails 84 and 86.

Turning now to FIG. 6, one of the plurality of first tread portions 22 is illustrated. The second tread portions 72 are generally identical to the first tread portions 22, and thus the description of the first tread portions 22 applies to the second tread portions 72.

The tread portions 22, 72 have a first support side 150 defining an upper side/surface to be contacted by a vehicle. The tread portions include on the first support side 150 one or more surface features, and in the illustrated embodiment channels 152 and openings 154 for improving/enhancing the frictional engagement and gripping ability between the tread portions and the vehicle. The channels 152 are spaced apart along the first support side 150 in a direction substantially perpendicular to the non-linear axis, and define grooves, openings, indentations, etc. The openings 154 define holes, gaps, spaces, etc. that extend through the first support side 150, which may be any suitable shape, and the openings 154 allow for debris, liquid, etc. to drain from the first support side 150.

The tread portions 22, 72 extend between a first side 156 and a second side 158 and include one or more mating portions 160 projecting outwardly from the first side 156 toward another tread portion and one or more mating portions (not shown) projecting outwardly from the second side 158 toward another tread portion. The mating portions can be a tab, projection, finger, etc., and are spaced along the first and second sides 156 and 158 such that a gap or space is located between adjacent mating portions. The tread portions may be assembled together as disclosed in U.S. Pat. No. 9,221,631 filed Jul. 10, 2014, which is hereby incorporated herein by reference.

The tread portions 22, 72 also include a second support side 170 opposite the first support side 150. The tread portions define one or more tread openings, and in the illustrated embodiment first and second tread openings 172 and 174 into which the first and second rails 34 and 36 respectively are removably received or into which the third and fourth rails 84 and 86 respectively are removably received.

The tread portions also define one or more tread channels, and in the illustrated embodiment pairs of first and second tread channels 176 and 178 through which the L-shaped portions 44 and 46 with lights 26 extend respectively and through which the L-shaped portions 106 and 108 with lights 76 extend respectively. Each channel 176, 178 opens towards the respective tread opening 172, 174 such that when the rails 34 and 84 and the rails 36 and 86 are slid through the openings 172 and 174, the L-shaped portions 44 and 106 and the L-shaped portions 46 and 108 are slid through the channels 176 and 178. In this way, the substantially rectangular portions 40, 42, 102, and 104 trap the respective lights 26 and 76 in the channels 176 and 178. Each pair of tread channels 176 and 178 can be provided on opposite ends of the respective tread openings 172 and 174. A gap 180, 182 or opening is formed between each pair of channels 176 and 178 and above the respective opening 172, 174 through which the lights are visible. The L-shaped portions 44, 46, 106 and 108 provide protection for the lights 26 and 76, for example from items passing through the gaps 180 and 182. By positioning the lights 26 above the rails 34 and 36 and the lights 76 above the rails 84 and 86, the lights reflect off the rails, for example off of the metallic surface of the rails, thereby creating a runway for the user.

Turning now to FIG. 7, an example of a portion of the first ramp portion 12 is shown. The first and second rails 34 and 36 are shown attached to one of the tread portions 22. The first rail 34 is disposed in the first tread opening 172 and the second rail 36 is disposed in the second tread opening 174. As shown, the tread portion 22 has been moved along the rails 34 and 36 from the first end 30 towards the second end 32 until the tread portion 22 contacts/engages the support structure 38, which is not shown in FIG. 7, to prevent the tread 22 from being inadvertently dislodged/removed.

Figure 10:
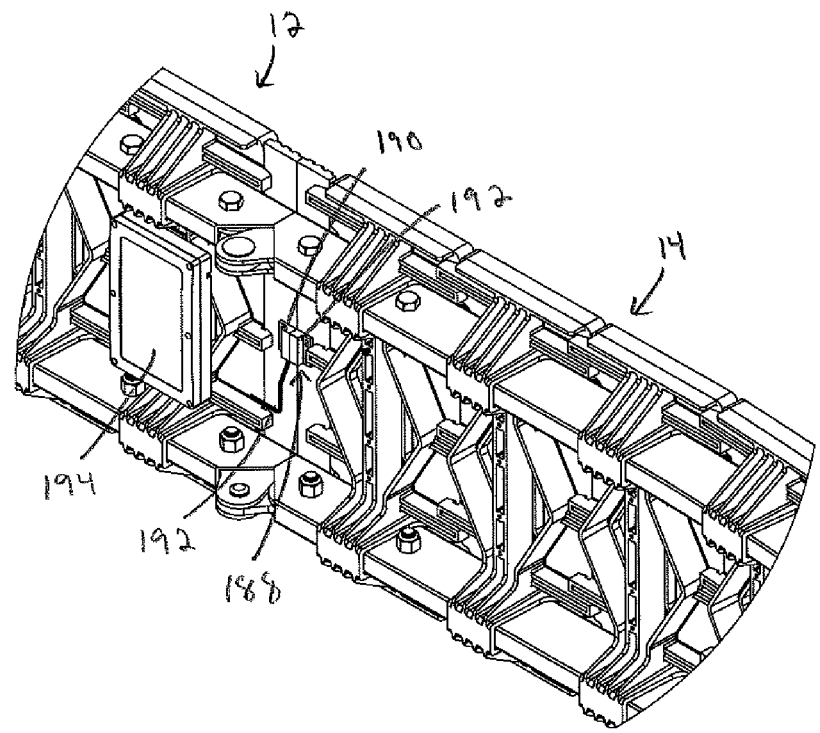
FIG. 10 is a partial bottom perspective view of the loading ramp in the extended position.
Figure 11:
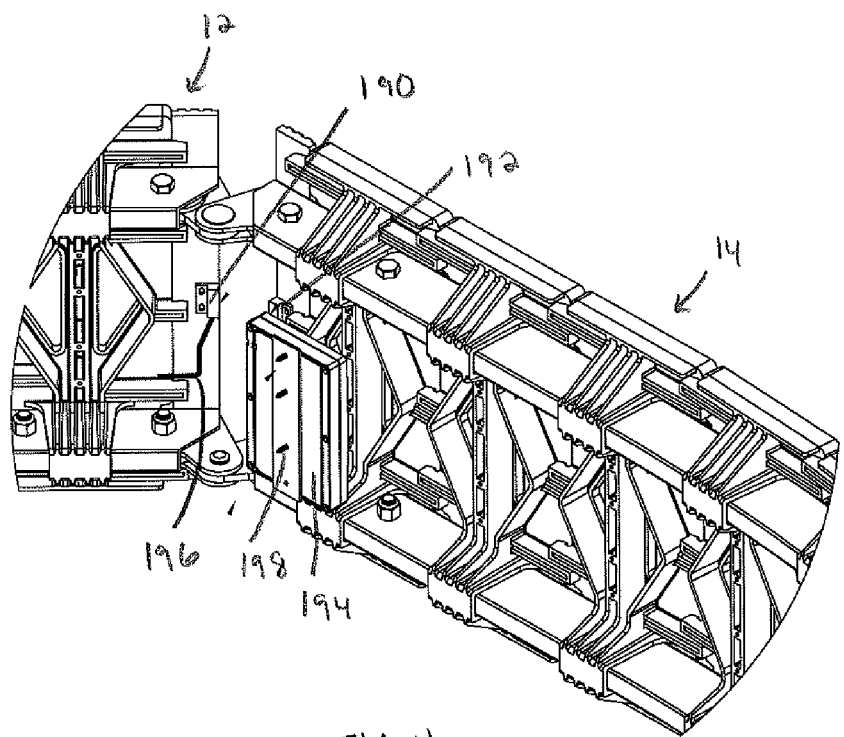
FIG. 11 is a partial bottom perspective view of the loading ramp in a partially extended position.

Turning now to FIGS. 9-12, the loading ramp 10 includes a switch assembly 188 having a first portion 190 coupled to the first ramp portion 12 and a second portion 192 coupled to the second ramp portion 14. In the illustrated embodiment, the first portion 190 is a reed switch and the second portion 192 is a magnet. The first and second portions 190 and 192 are coupled to the bottom of the first support structure 28 and the second support structure 88 respectively, and each have a face perpendicular to the bottom of the support structures 28 and 88 that engage with one another in the extended position as shown in FIG. 10 to activate the switch assembly to turn on or activate the lights. FIGS. 9 and 11 show the loading ramp in partially extended positions where the first and second portions 190 and 192 are disengaged thereby deactivating the switch assembly 188 and turning off or deactivating the lights. It will be appreciated that in some embodiments, the switch assembly 188 may be activated when first and second portions 190 and 192 are in close proximity to one another.

The pairs of lights 26 and 76 are each operatively coupled to the first portion 190 of the switch assembly 188 in any suitable manner, such as a wire 196, such as a positive line. It will be appreciate that the wire 196 may be one or more wires connected to the first portion 190, for example, the wire 196 may be one wire having multiple positive lines connected to it. Although not shown, wires may run from the lights 76 to the first portion 190 near the hinge assembly 26 to connect to the wire 196, or the wires may run from the lights 76 to the first portion 190 in any other suitable way. Similarly, wires may run from the lights 26 to the first portion 190 in any suitable way.

Figure 12:
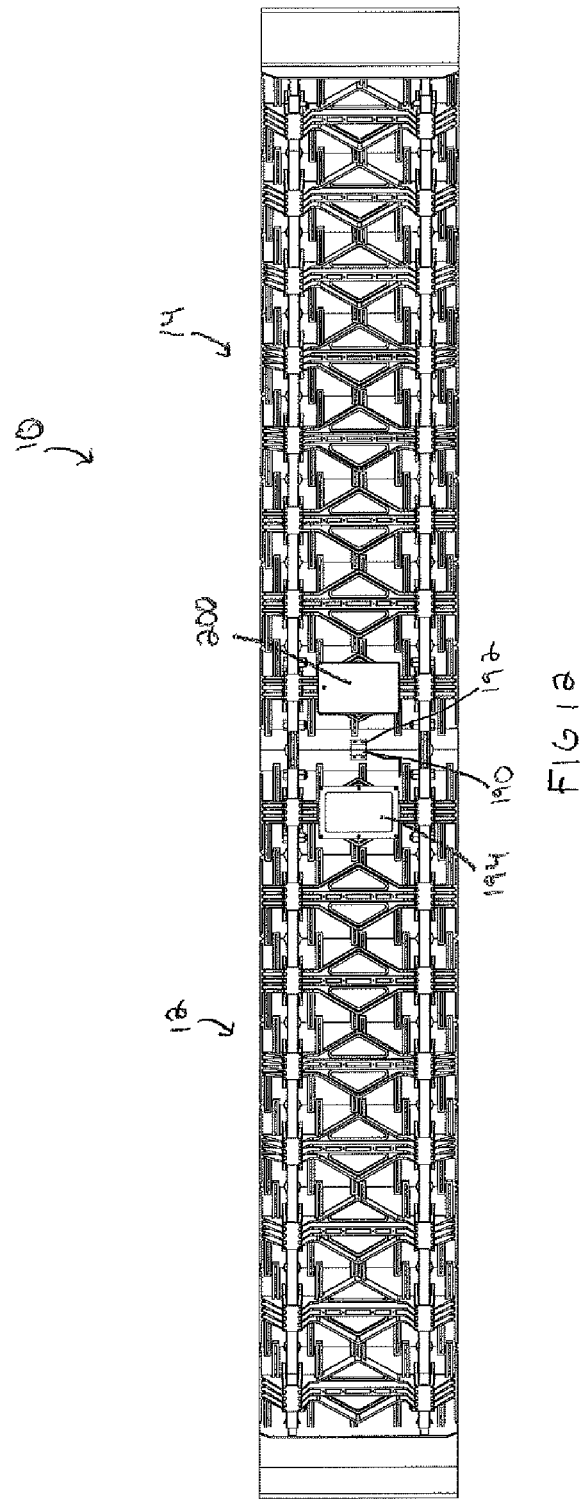
FIG. 12 is a bottom view of the loading ramp.
Figure 13:
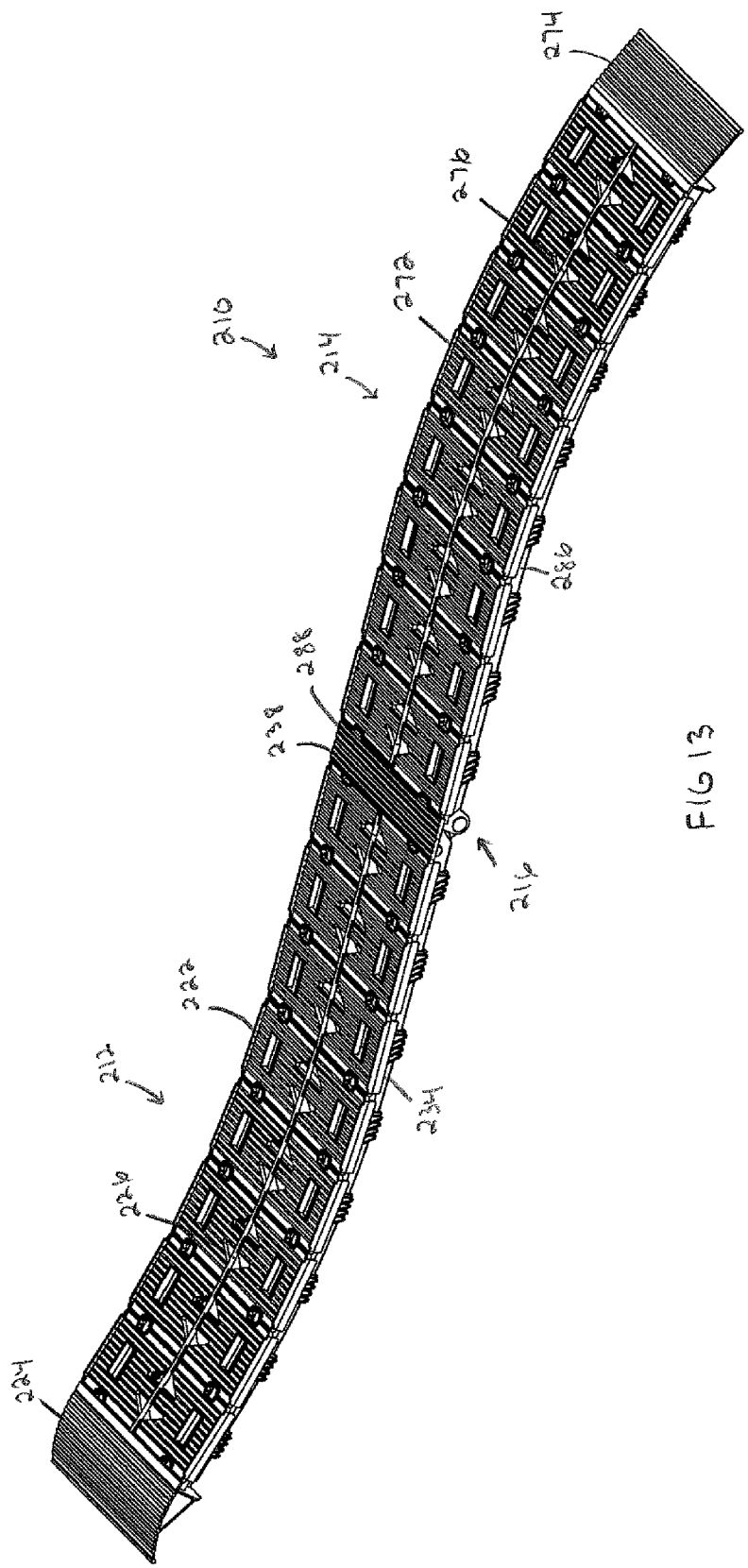
FIG. 13 is a perspective view of another exemplary loading ramp in an extended position.
Figure 14:
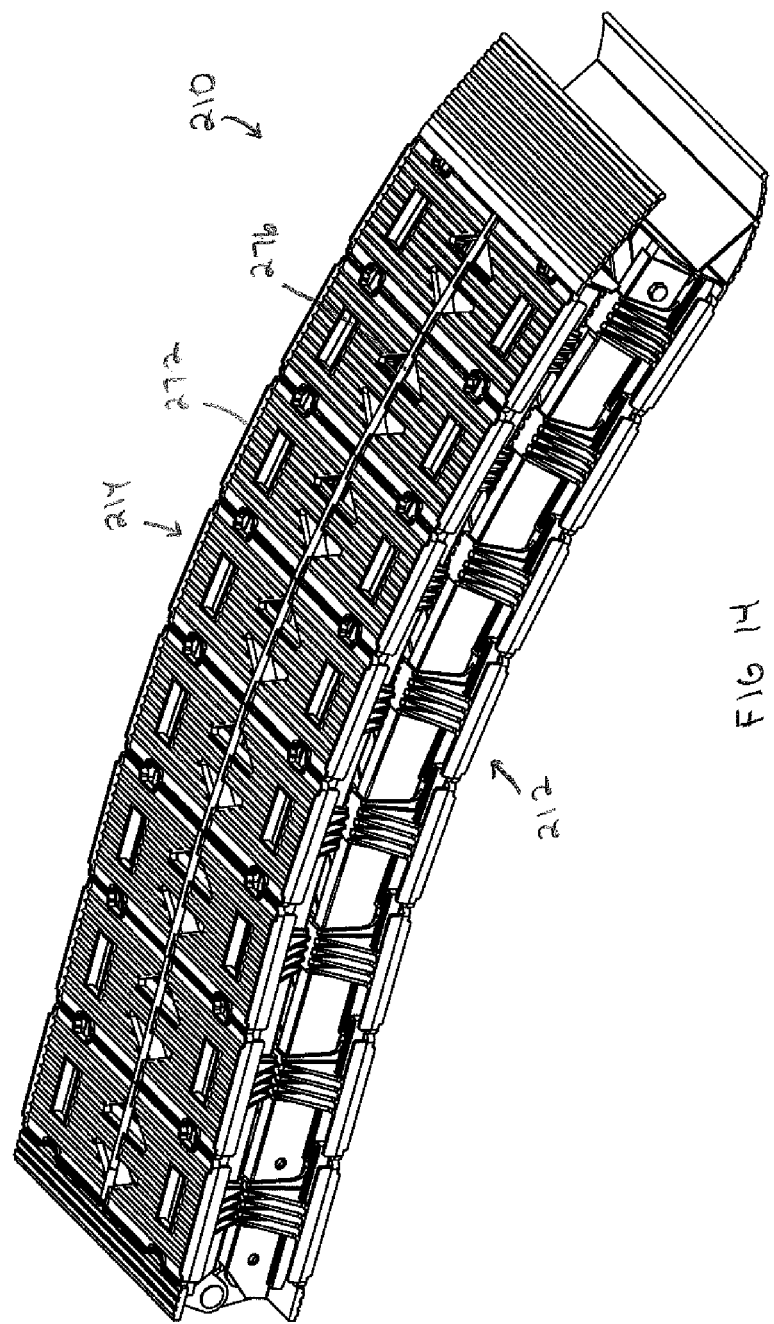
FIG. 14 is a perspective view of the loading ramp in a folded position.

The loading ramp 10 further includes a power source 194 coupled to one of the first or second ramp portions 12 and 14, and in the illustrated embodiment coupled to the first ramp portion 12. As shown in FIG. 10, the power source, which may be any suitable power source such as a battery hub, is coupled to the second support side 170 of one or more of the treads 22 in any suitable manner, such as by fasteners 198. As shown in FIG. 12, coupled to the second ramp portion 14 can be a housing 200 that houses the power source 194 in the folded position.

The power source 194 is operatively coupled to the switch assembly 188 and to the lights 26 and 76. The power source 194 is operatively coupled to the lights 26 and 76 in any suitable manner, such as by a wire, such as a common line, and the power source 194 is operatively coupled to the first portion 190 of the switch assembly 188 in any suitable manner, such as by the wire 196, such as a positive line. Although not shown, wires may run from the lights 76 to the power source 194 near the hinge assembly 26, or the wires may run from the lights 76 to the power source 194 in any other suitable way. Similarly, wires may run from the lights 26 to the power source 194 in any suitable way.

Turning now to FIGS. 13-19, an exemplary embodiment of the loading ramp is shown at 210. The loading ramp 210 is substantially the same as the above-referenced loading ramp 10, and consequently the same reference numerals but indexed by 200 are used to denote structures corresponding to similar structures in the loading ramps. In addition, the foregoing description of the loading ramp 10 is equally applicable to the loading ramp 210 except as noted below.

The loading ramp 210 includes a first ramp portion 212 and a second ramp portion 214 coupled together by a hinge assembly 216. The first ramp portion 212 includes a plurality of first tread portions 222, a first end portion 224, one or more lights 226, and in the illustrated embodiment a LED strip light, a first rail 234, a second rail 236, and a first support structure 238. The second ramp portion 214 includes a plurality of second tread portions 272, a second end portion 274, one or more lights 276, and in the illustrated embodiment a LED strip light, a third rail 284, a fourth rail 286, and a second support structure 288.

Figure 15:
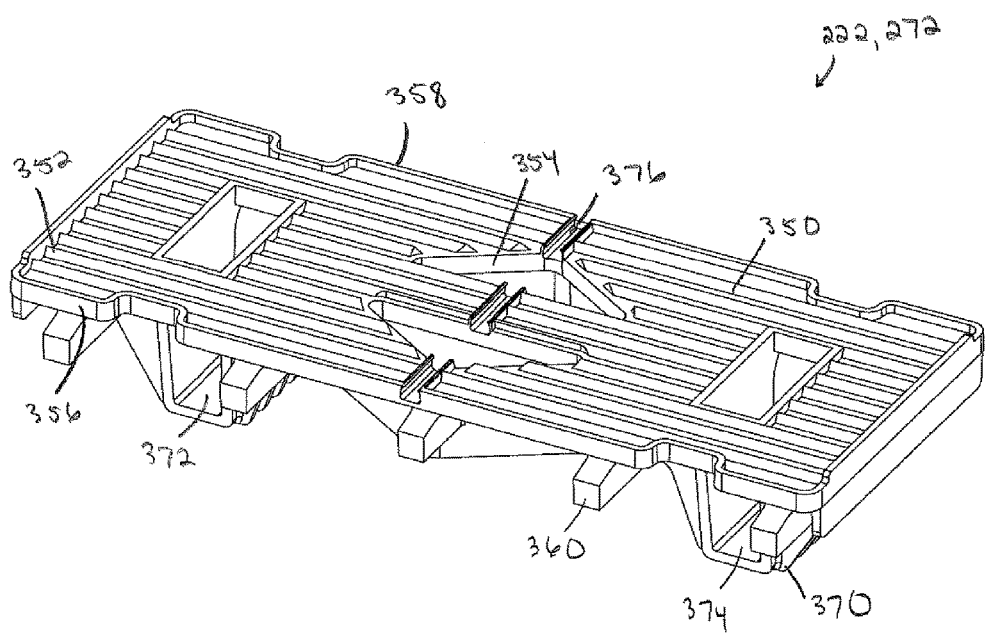
FIG. 15 is a perspective view of an exemplary tread portion of the loading ramp.

Referring now to FIG. 15, one of the plurality of first tread portions 222 is illustrated. The second tread portions 272 are generally identical to the first tread portions 222, and thus the description of the first tread portions 222 applies to the second tread portions 272.

The tread portions 222, 272 have a first support side 350 defining an upper side/surface to be contacted by a vehicle. The tread portions include on the first support side 350 one or more surface features, such as channels 352 and openings 354. The tread portions 222, 272 extend between a first side 356 and a second side 358 and include one or more mating portions 360. The tread portions 222, 272 also include a second support side 370 opposite the first support side 150. The tread portions define first and second tread openings 172 and 174 into which rails are received.

The tread portions also define one or more tread channels, and in the illustrated embodiment a tread channel 376 in which the lights 226 and 276 are received. The channels 376 open out away from the first support side 350 to receive and hold the lights 226 and 276, which may be strip lights.

Figure 16:
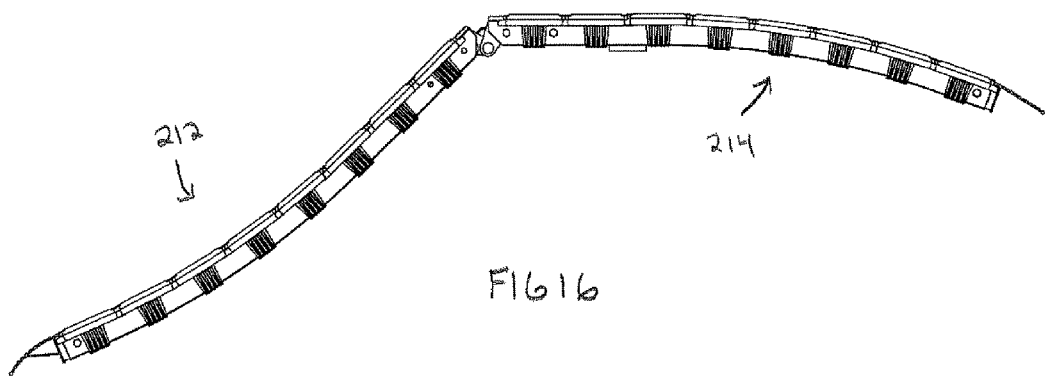
FIG. 16 is a side view of the loading ramp in a partially extended position.
Figure 17:
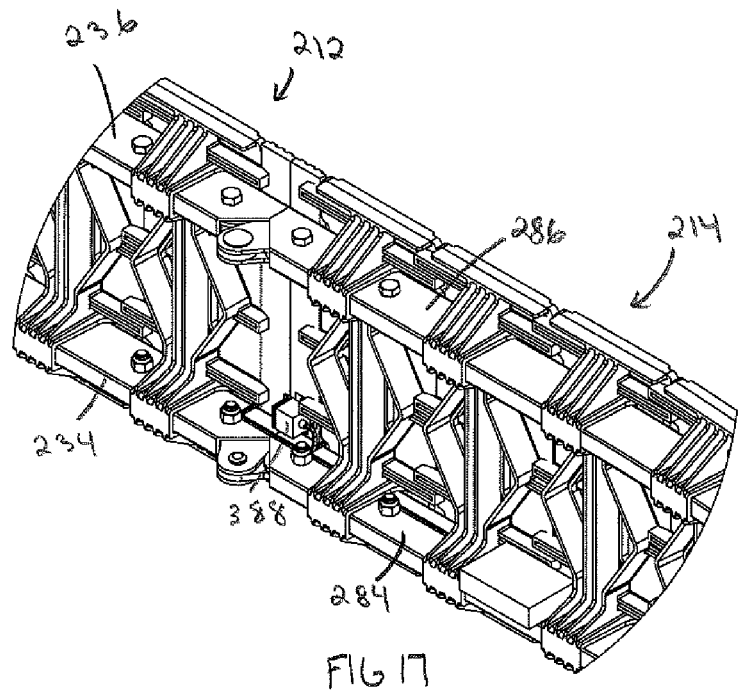
FIG. 17 is a partial bottom perspective view of the loading ramp in the extended position.
Figure 18:
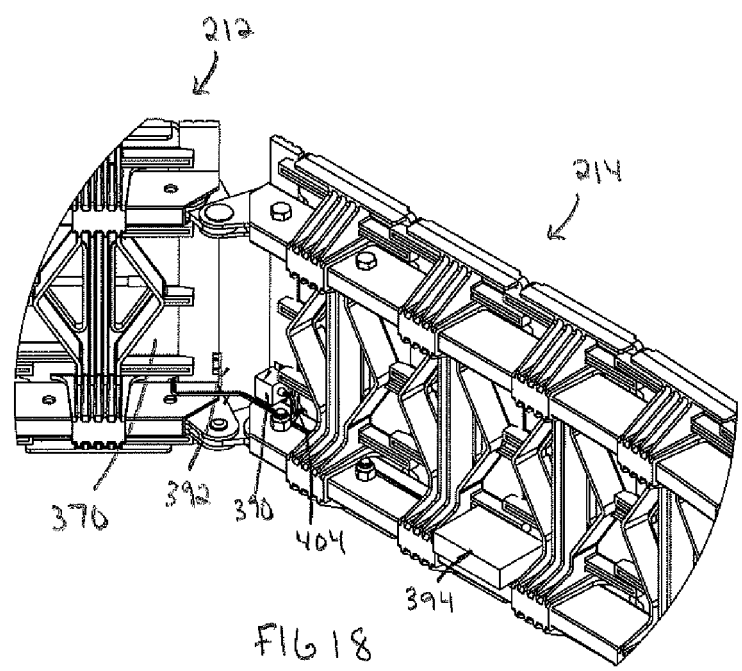
FIG. 18 is a partial bottom perspective view of the loading ramp in a partially extended position.
Figure 19:
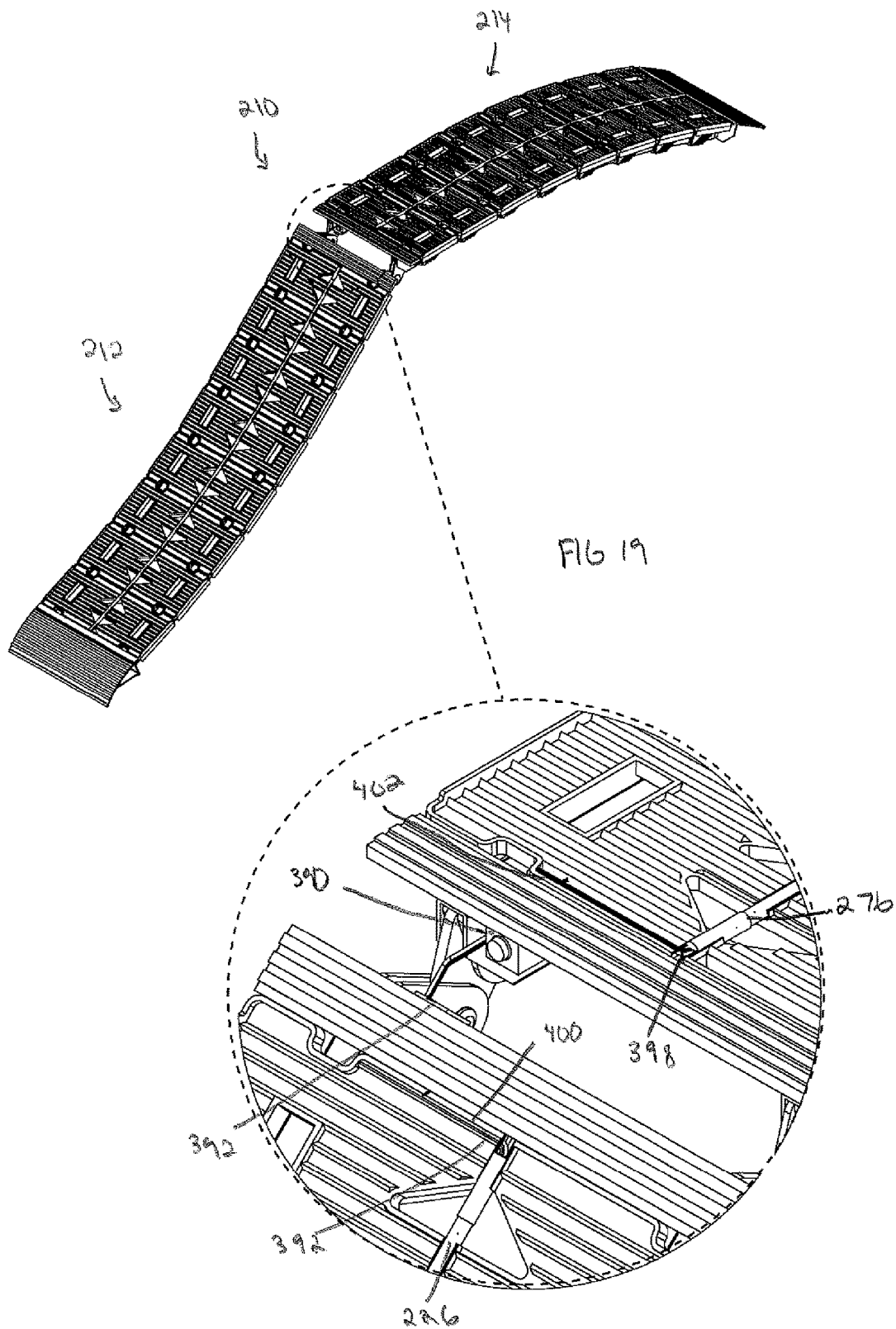
FIG. 19 is a perspective view of the loading ramp in a partially extended position.

Turning now to FIGS. 17-19, the loading ramp 210 includes a switch assembly 388 having a first portion 390 coupled to the second ramp portion 214 and a second portion 392 coupled to the first ramp portion 212. In the illustrated embodiment, the first portion 390 is a pressure switch and the second portion 392 is a pedal. The first and second portions 390 and 392 are coupled to the bottom of the second support structure 288 and the first support structure 228 respectively, and each have a face perpendicular to the bottom of the support structures 228 and 288 that engage with one another in the extended position as shown in FIG. 17. FIGS. 16, 18, and 19 show the loading ramp in partially extended positions where the first and second portions 390 and 392 are disengaged.

The lights 226 and 276 are each operatively coupled to the first portion 390 of the switch assembly 388 in any suitable manner, such as wires 396 and 398 respectively, such as a positive line. The loading ramp 210 further includes a power source 394 coupled to one of the first or second ramp portions 212 and 214, and in the illustrated embodiment coupled to the second ramp portion 214. As shown in FIG. 18, the power source 394 is coupled to the third rail 284 in any suitable manner, such as by fasteners.

The power source 394 is operatively coupled to the switch assembly 388 and to the lights 226 and 276. The power source 394 is operatively coupled to the lights 226 and 276 in any suitable manner, such as wires 400 and 402, such as a common line, and the power source 494 is operatively coupled to the first portion 390 of the switch assembly 388 in any suitable manner, such as by wire 404, such as a positive line.

Turning now to FIGS. 20-23, an exemplary embodiment of the loading ramp is shown at 410. The loading ramp 410 is substantially the same as the above-referenced loading ramp 210, and consequently the same reference numerals but indexed by 200 are used to denote structures corresponding to similar structures in the loading ramps. In addition, the foregoing description of the loading ramp 410 is equally applicable to the loading ramp 210 except as noted below.

The loading ramp 410 includes a first ramp portion 412 and a second ramp portion 414 coupled together by a hinge assembly 416. The first ramp portion 412 includes a plurality of crossbars 422, a first end portion 424, one or more lights 426, and in the illustrated embodiment LED strip lights, a first rail 434, a second rail 436. In the illustrated embodiment, a light 426 is coupled to each rail 434 and 436. The crossbars 422 are coupled to the first and second rails 434 and 436 in any suitable manner. The second ramp portion 414 includes a plurality of crossbars 472, a second end portion 474, one or more lights 476, and in the illustrated embodiment LED strip lights, a third rail 484, and a fourth rail 486. In the illustrated embodiment, a light 476 is coupled to each rail 484 and 486. The crossbars 472 are coupled to the third and fourth rails 484 and 486 in any suitable manner.

Figure 20:
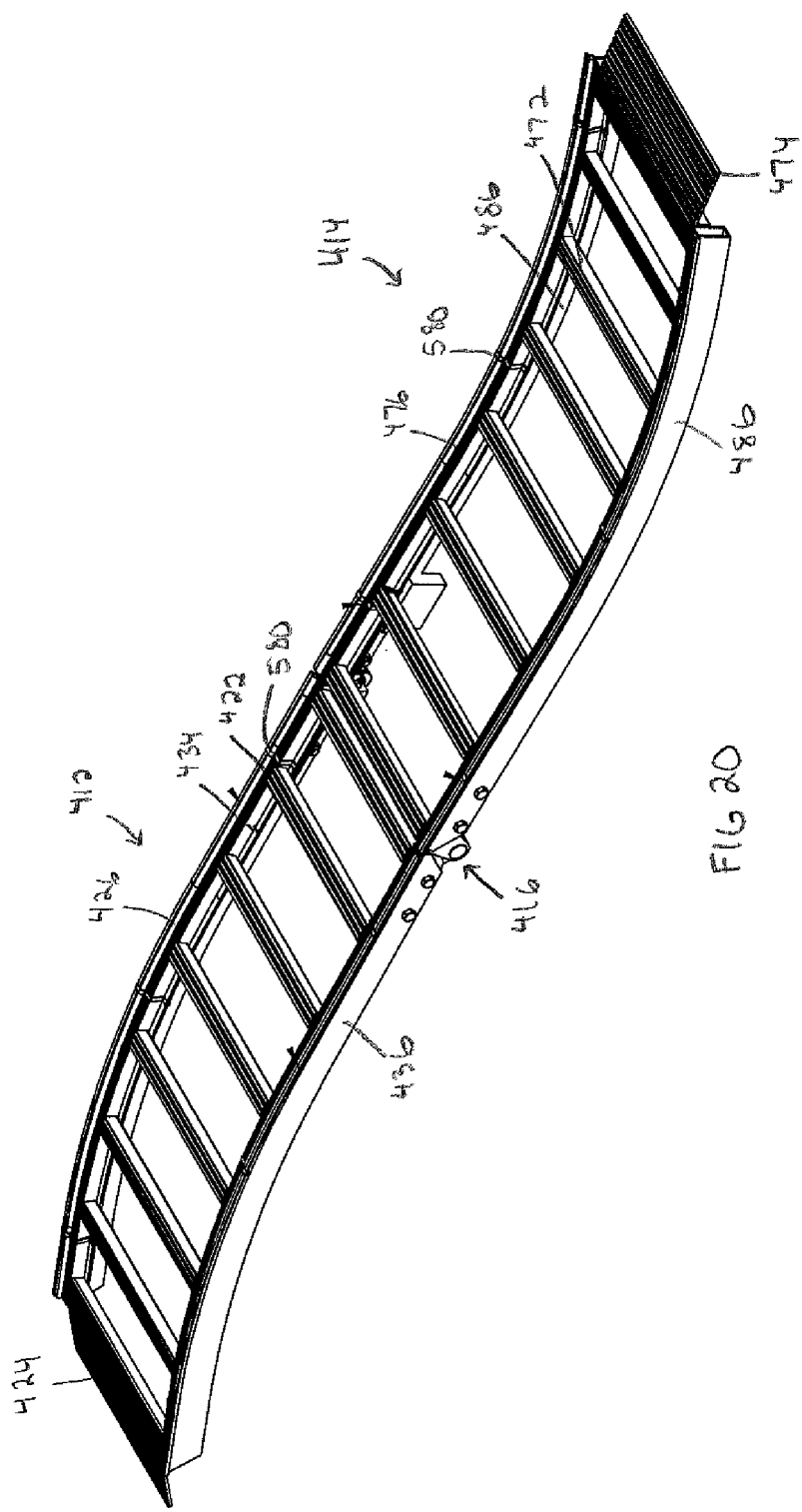
FIG. 20 is a perspective view of still another exemplary loading ramp in an extended position.
Figure 21:
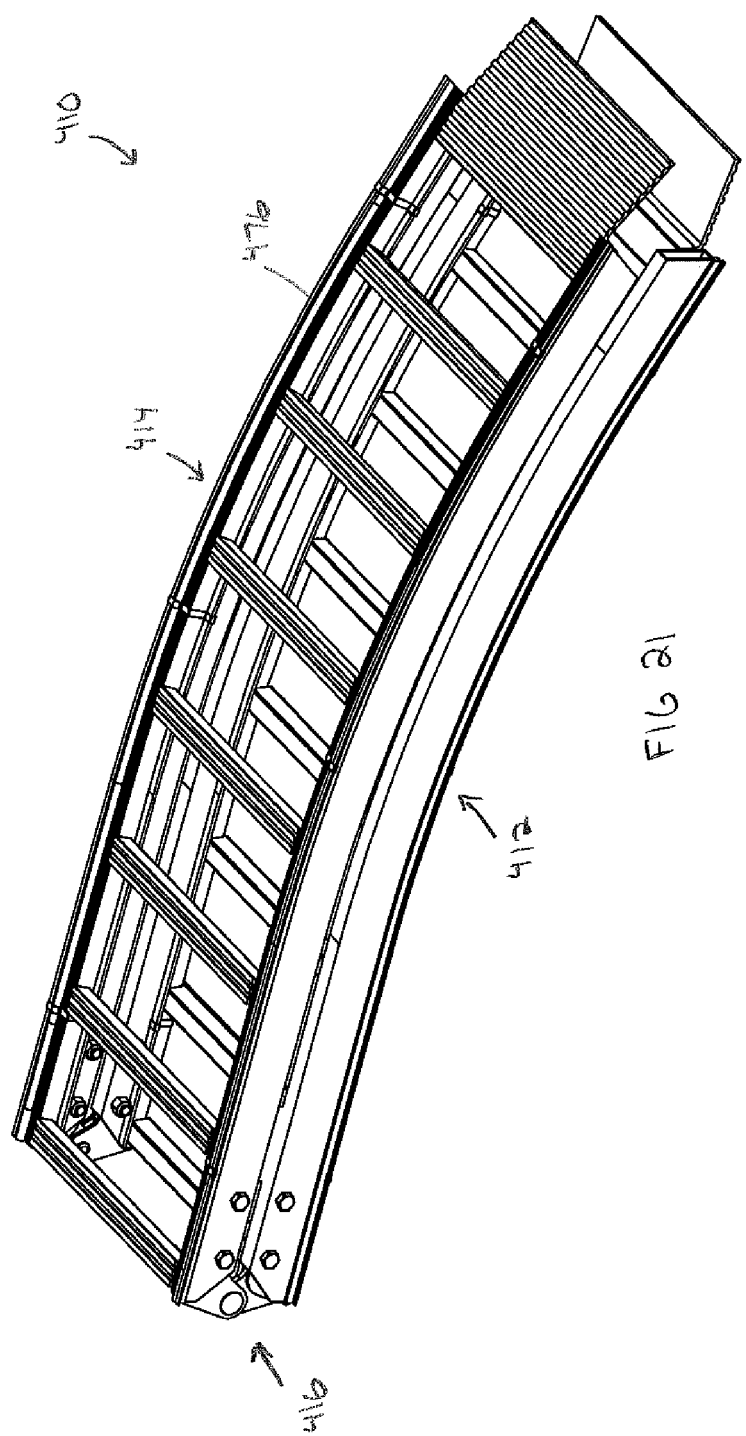
FIG. 21 is a perspective view of the loading ramp in a folded position.
Figure 22:
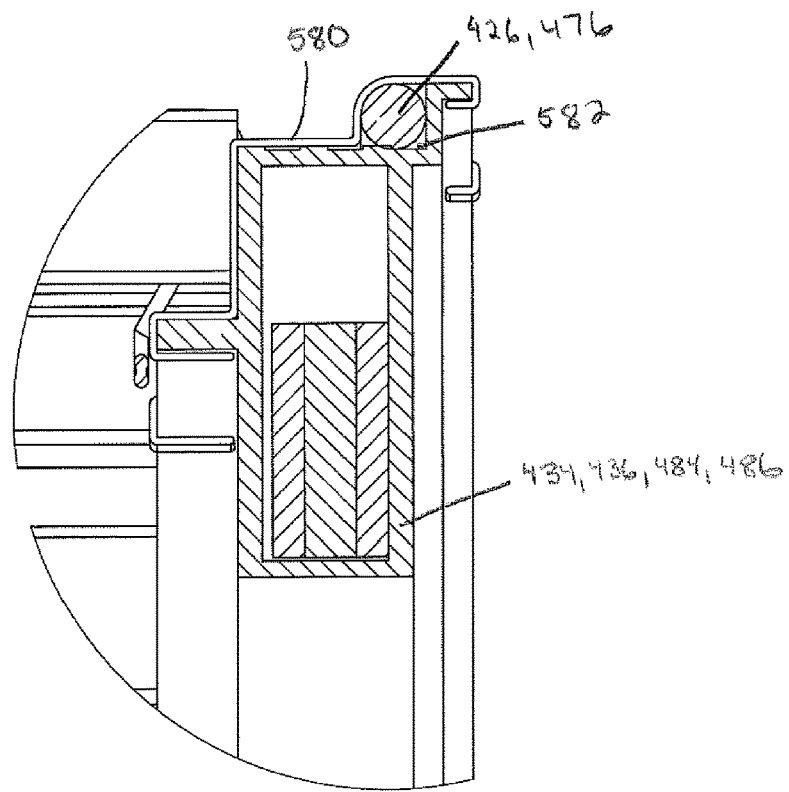
FIG. 22 is a partial cross-sectional view of the loading ramp.

As shown in FIGS. 20 and 22, the lights 426 and 476 are coupled to the respective rails 434, 436, 484, 486 by a plurality of clips 580 spaced along a length of the rails. The clips 480 hold the lights 426 and 476 against L-shaped channels 582 formed at the top of the rails and clip to sides of the rails.

Figure 23:
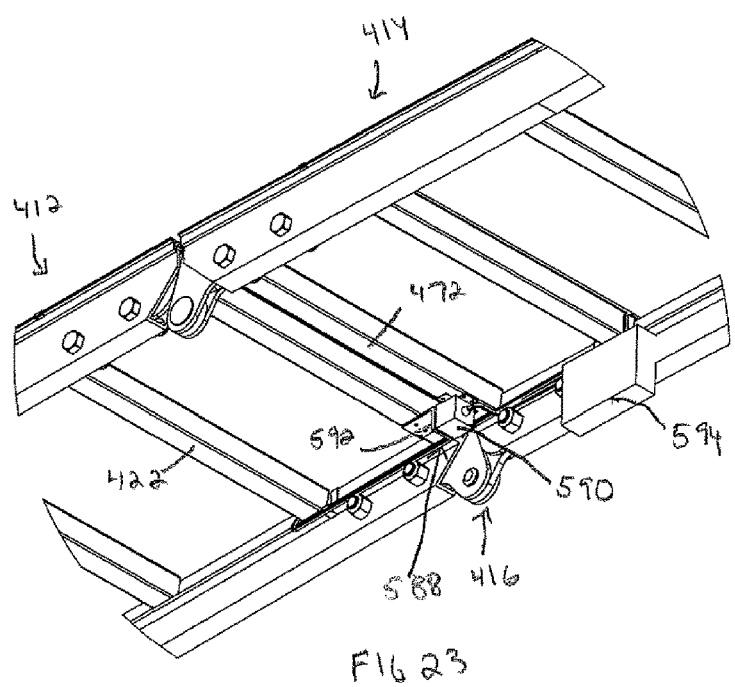
FIG. 23 is a partial bottom perspective view of the loading ramp in the extended position.

Turning now to FIG. 23, the loading ramp 410 includes a switch assembly 588 having a first portion 590 coupled to the second ramp portion 414 and a second portion 592 coupled to the first ramp portion 412. In the illustrated embodiment, the first portion 590 is a pressure switch and the second portion 592 is a pedal. The first and second portions 590 and 592 are coupled to the bottom of the crossbars 472 and 422 respectively, and each have a face perpendicular to the bottom of the crossbars 422 and 472 that engage with one another in the extended position as shown in FIG. 23 to complete the electrical circuit.

The loading ramp 410 further includes a power source 594 coupled to one of the first or second ramp portions 412 and 414, and in the illustrated embodiment coupled to the second ramp portion 414. As shown in FIG. 23, the power source 394 is coupled to the third rail 484 in any suitable manner, such as by fasteners. The power source 594 is operatively coupled to the switch assembly 588 and to the lights 426 and 476 in any suitable manner.

The lights may be positioned across the width of the treads, may be attached to the rails, and/or may be provided in other configurations.

Although certain embodiments have been shown and described, it is understood that equivalents and modifications falling within the scope of the appended claims will occur to others who are skilled in the art upon the reading and understanding of this specification.

What is claimed is:

1. A loading ramp comprising:
a first ramp portion;
a second ramp portion;
a hinge assembly coupling the first and second ramp portions such that the first and second ramp portions are movable relative to one another between an extended position and a folded position;
a switch assembly having a first portion coupled to the first ramp portion and a second portion coupled to the second ramp portion, the first and second portions configured to engage or be in close proximity to one another in the extended position and disengage in the folded position;
at least one first LED strip light coupled to and extending along a length of the first ramp portion, the at least one first LED strip light being operatively coupled to the first portion of the switch assembly to be switchable between an on state when the first and second portions are engaged or in close proximity to one another and an off state when the first and second portions are moved away from one another; and
at least one second LED strip light coupled to and extending along a length of the second ramp portion, the at least one second LED strip light being operatively coupled to the first portion of the switch assembly to be switchable between an on state when the first and second portions are engaged or in close proximity to one another and an off state when the first and second portions are moved away from one another,
wherein in the extended position the first and second portions of the switch assembly engage or are in close proximity to one another to illuminate the first and second LED strip lights, and in the folded position the first and second portions of the switch assembly are moved away from one another to turn off the first and second LED strip lights,
wherein the first and second LED strip lights extend through one or more channels formed in the respective first and second ramp portions at top surfaces thereof, and
wherein the one or more channels extend along the lengths of the first and second ramp portions and open to a bottom surface of the respective first and second ramp portions.

2. The loading ramp according to claim 1, further including a power source coupled to one of the first or second ramp portions, wherein the power source is operatively coupled to the switch assembly and the first and second LED strip lights to power the LED strip lights.

3. The loading ramp according to claim 2, wherein the power source is a battery hub coupled to a bottom surface of one of the first or second ramp portions.

4. The loading ramp according to claim 2, wherein the first and second LED strip lights are operatively coupled to the first portion of the switch assembly by a respective wire, the first and second LED strip lights are operatively coupled to the power source by a respective wire, and the power source is operatively coupled to the switch assembly by a wire.

5. The loading ramp according to claim 1, wherein the first and second portions of the switch assembly each have a face substantially perpendicular to top surfaces of the first and second ramp portions, and wherein the faces are configured to engage or be in close proximity to one another in the extended position.

6. The loading ramp according to claim 1, wherein the first portion of the switch assembly is a reed switch and the second portion is a magnet.

7. The loading ramp according to claim 1, wherein the first portion of the switch assembly is a pressure switch and the second portion is a pedal.

8. The loading ramp according to claim 1, wherein the first ramp portion includes a first rail portion and a first tread portion having a tread opening through which the first rail portion extends and a channel through which the at least one first LED strip light extends, and wherein the second ramp portion includes a second rail portion and a second tread portion having a tread opening through which the second rail portion extends and a channel through which the at least one second LED strip light extends.

9. The loading ramp according to claim 8, wherein each channel opens towards the respective tread opening, and wherein the first and second rail portions trap the first and second LED strip lights in the respective channels.

10. The loading ramp according to claim 8, further including an L-shaped portion coupled to or integrally formed with the first rail portion and extending through the channel with the first LED strip light, and an L-shaped portion coupled to or integrally formed with the second rail portion and extending through the channel with the second LED strip light.

11. A loading ramp comprising:
a first ramp portion Including a first rail portion and a plurality of first tread portions removably attached to the first rail portion and having a top surface forming a support surface to support a load of a vehicle, each of the first tread portions including at least one channel extending along a length of the respective first tread portion along the top surface;
a second ramp portion including a second rail portion and a plurality of second tread portions removably attached to the second rail portion and having a top surface forming a support surface to support the load of the vehicle, each of the second tread portions including at least one channel extending along a length of the respective second tread portion along the top surface;
a hinge assembly coupling the first and second ramp portions such that the first and second ramp portions are movable relative to one another between an extended position and a folded position;
at least one first strip light coupled to the first ramp portion and extending through the at least one channel of each of the first tread portions;
at least one second strip light coupled to the second ramp portion and extending through the at least one channel of each of the second tread portions;
a switch assembly having a first portion coupled to the first ramp portion and a
second portion coupled to the second ramp portion, the switch assembly being operatively coupled to the at least one first and second strip lights and the first and second portions configured to engage or be in close proximity to one another in the extended position and disengage in the folded position,
wherein in the extended position the at least one first and second strip lights are activated, and in the folded position the at least one first and second tip lights are deactivated.

12. The loading ramp according to claim 11, further including a power source coupled to one of the first or second ramp portions, wherein the power source is operatively coupled to the first and second lights to power the lights.

13. The loading ramp according to claim 11, wherein the first and second ramp portions each include one or more channels opening to a top surface of each portion for receiving the at least one first or second light respectively.

14. The loading ramp according to claim 11, wherein the first strip light is a first LED strip light and the second strip light is a second LED strip light.

15. The loading ramp according to claim 11, wherein each of the first and second tread portions has the top surface and a bottom surface, and wherein each channel in each of the first and second tread portions opens towards the respective bottom surface.

16. The loading ramp according to claim 11, wherein the at least one channel extending along the length of each of the first tread portions includes a pair of channels extending along the length of each of the first tread portions and being spaced from one another along a width of the respective first tread portion, wherein the at least one first strip light includes a pair of first strip lights each extending through one of the pair of channels of each of the first tread portions, wherein the at least one channel extending along the length of each of the second tread portions includes a pair of channels extending along the length of each of the second tread portions and being spaced from one another along a width of the respective second tread portion, and wherein the at least second first strip light includes a pair of second strip lights each extending through one of the pair of channels of each of the second tread portions.

* * * * *